G. W. COLLIN.
ELECTRIC SOLENOID.
APPLICATION FILED JUNE 1, 1910.
1,033,543.
Patented July 23, 1912.
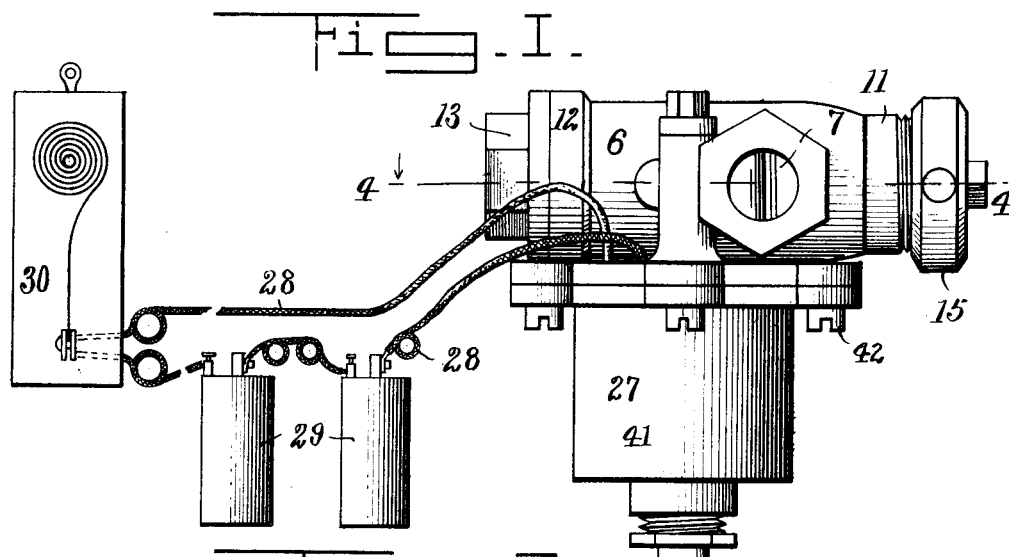
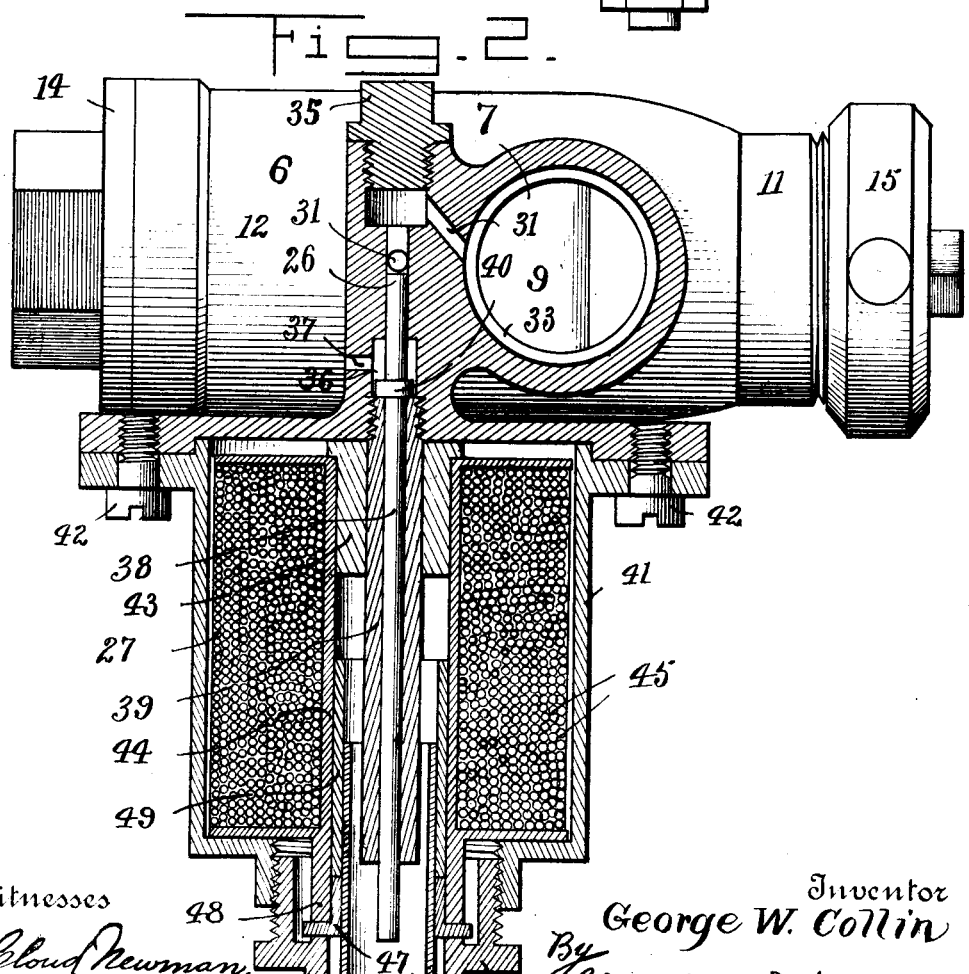
Witnesses
L. Cloud Newman.
Ruth Raymond.
Inventor
George W. Collin
By Chamberlain & Newman
Attorneys

UNITED STATES PATENT OFFICE.

GEORGE W. COLLIN, OF BRIDGEPORT, CONNECTICUT, ASSIGNOR TO THE COLLIN VALVE COMPANY, OF PORTLAND, MAINE, A CORPORATION OF MAINE.

ELECTRIC SOLENOID.

1,033,543.   Specification of Letters Patent.   Patented July 23, 1912.

Application filed June 1, 1910. Serial No. 564,475.

*To all whom it may concern:*

Be it known that I, GEORGE W. COLLIN, a citizen of the United States, and resident of Bridgeport, in the county of Fairfield and State of Connecticut, have invented certain new and useful Improvements in Electric Solenoids, of which the following is a specification.

My invention relates to an improved form of electric solenoid, adapted for various uses and particularly that of operating steam admission valves, tripping mechanisms for valves and other forms of devices.

The objects of the invention are to improve the construction of solenoids—particularly solenoids intended for the operation of valves and the like.

In the accompanying drawings forming a part of this specification I have shown my improved form of solenoid, applied, to an improved form of steam admission valve, such as is shown for example in my Patent No. 949,294, dated February 15, 1910, wherein the main valve is operated by a piston, itself controlled by a pilot valve. In the accompanying drawings the improved solenoid herein described is shown arranged to operate the said pilot valve.

In the said drawings:—Figure 1, shows a side view of a steam admission valve of the general type shown in my said Patent No. 949,294 with my improved form of solenoid applied and connected up with batteries and thermostat as in use. Fig. 2, is a cross section through the valve and solenoid taken on the axis of the pilot valve.

The type of valve shown in the drawings is that of a steam pressure admission valve as employed in car heating systems and designed to be used between the main train steam piping and the car branch or service pipe, one valve being used for each car. This valve is normally open allowing a free flow of steam to the piping of the car, when steam connections are made. This construction is such as to be well adapted to be operated by a solenoid when connected with battery and thermostat located within the car, thus insuring the automatic operation of the valve by the change of temperature within the car and thereby affording means for providing uniform heat for the car.

6 represents the body of the valve, and to which the solenoid, solenoid case and other associate parts are connected.

7 designates the inlet connection of such valve body, and 26 an auxiliary or pilot valve, controlling the action of the main valve as described in my Patent No. 949,294, said pilot valve 26 being arranged to be actuated, as hereinafter described, by the plunger or armature of the solenoid magnet 27, the coils of which solenoid are connected by wires 28 with a battery 29 and a thermostat 30.

The thermostat is obviously for the purpose of making and breaking the electric connection intermediate the batteries and solenoid to operate the latter and which in turn operates an auxiliary valve for controlling the main valve. This thermostat would obviously be suitably located within the car, so as to be exposed to the temperature thereof, while the batteries could be located in any suitable place. The auxiliary valve 26 comprises a stem operatively mounted within a bore and arranged at a right angle to the passage 31. The outer end of said bore is inclosed by a plug 35 while the inner end is enlarged as at 36 and provided with an outlet 37 whereby any escaping steam or condensation from the auxiliary valve will be permitted to escape. The auxiliary valve stem 38 is reciprocatingly mounted within a brass tube 39 attached to the body in line with such stem and is provided with a head 40 to prevent it from dropping down.

Except for a soft iron core and an iron armature, my improved solenoid is made of non-magnetic material, such as bronze or brass and is clearly shown in Fig. 2. It is inclosed in a suitable case 41 that is detachably connected to the valve body which is also preferably made of bronze or brass by means of screws 42. A soft iron core 43 is pressed tightly into the upper end of the bore of the solenoid spool, and its central hole snugly fits the tube 39 which is threadably attached to the valve. The tube and core thus center the spool which is held in place by the case and cap 46. Upon the spool of the solenoid is shown the usual wire windings 45, the outer layers of which wires are covered by the before mentioned case 41 attached to the valve body. This case is provided with a hub on its lower end that is threaded internally to receive a cap 46 shown attached thereto and seated against a collar 47 set against the extended end 48 of the spool. A cylindrical shaped soft iron armature 49 is freely mounted in the lower end of the bore of the spool and is free to reciprocate vertically to and from the core 43. This armature is provided with a non-magnetic brass liner 50 that extends below the armature proper and is provided with a bridge 51 that forms a means to abut against the end of the valve rod 38 for the operation of the auxiliary valve, when the solenoid is energized and the armature attracted. The armature is normally supported in position shown in Fig. 2, by reason of it resting on the upper end of the before mentioned collar 47 and thus located in juxtaposition with reference to the other parts as to be readily operated.

From the foregoing construction it will be seen that the armature can readily be taken out should occasion require by first removing the cap 46 and then the collar 47 which frees the armature and permits it to drop out. The stationary core 43 concentrates the lines of magnetic force between it and the armature when the solenoid is energized, multiplying the attraction of the armature, and its power to perform the function required.

It will be obvious that the distance of travel of the armature can be varied if desired, better to accommodate the character of work required. The nearer the moving armature approaches the stationary core 43 the greater is the force lifting the armature, until it contacts with core 43 when it is held with great power as long as the electric current energizes the solenoid. When the current is broken the solenoid loses its energy instantly and the armature drops to its normal position.

I do not wish to limit or confine myself in the use of this improved type of solenoid for the operation of valves, as it can be applied with equal advantage wherever solenoids are used; greatly increasing their force and efficiency.

When the steam is turned on the valve shown the passage 31 is open, by reason of the auxiliary valve stem being in its lowest position, as shown in Fig. 2, permitting flow through valve 6. When the thermostat 30 closes circuit through the coils of solenoid 27, and said solenoid lifts its plunger 49, the part 51 of the liner 50 engages the lower end of the stem 38 of pilot valve 26 and lifts said pilot valve, thus closing the passage 31 of valve 6. When the thermostat 30 opens the circuit of the solenoid the latter is deënergized and the plunger 49 falls permitting auxiliary valve 26 to open.

Having thus described my invention what I claim and desire to secure by Letters Patent is:—

1. In a solenoid of the class described, the combination with a suitable wire wound spool, of a core of magnetic material inserted therein, a guide tube within the core and extended below the same, a slide rod within the tube, and an armature slidably mounted within the spool and having means for engaging and actuating the slide rod within the tube.

2. In a solenoid of the class described, the combination with a suitable wire wound spool, of a core of magnetic material inserted therein, a guide tube within the core and having an extended threaded portion adapted for attachment to a support, a slide rod within the tube and extending beyond both ends thereof, and an armature slidably mounted within the spool and having means for engaging and actuating said slide rod.

3. In a solenoid of the class described, the combination with a suitable spool, of a core of magnetic material mounted therein, an armature slidably mounted within the spool, a liner of non-magnetic material secured to the armature, a collar to support the liner and armature, and means for supporting said collar.

4. In a solenoid of the class described, the combination with a suitable wire wound spool, of a core of magnetic material therein, a guide tube within the core, a slide rod within the tube, an armature slidably mounted within the spool and having secured to it a liner of non-magnetic material, said liner provided with means for actuating said rod, and means for supporting the armature within the spool.

5. In a solenoid of the class described, the combination with a suitable wire wound spool having an extension, of a core of magnetic material mounted in the end portion of the spool, a tube within the core and extended beyond the windings of the spool, an armature slidably mounted within the spool, and a pin slidably mounted within and extended beyond the end of the tube and designed to be operated upon by the armature.

6. In a solenoid of the class described, the combination with a suitable wire wound spool having an extension, of a core of magnetic material mounted in the end portion of the spool, a tube within the core and extended beyond the windings of the spool, an armature slidably mounted within the spool, a pin slidably mounted within ar i extended beyond the end of the tube and designed to be operated upon by the armature, a casing for inclosing the wire wound solenoid, a lining of non-magnetic material for the armature, a collar to engage the extension of the spool and to support the armature, and a removable cap to support the collar and liner.

7. In a solenoid of the class described, the combination with a suitable wire wound spool, of a core of magnetic material supported therein, a guide tube within the core, a slide rod within the tube, a hollow armature slidably mounted within the spool to operate the rod and having a liner of nonmagnetic material therein, a removable cap for supporting the armature within the spool, and a casing connected to inclose the solenoid.

8. In a solenoid of the class described, the combination with a suitable wire wound spool, of a core of magnetic material mounted in the upper end portion of the spool, a guide tube extended below the core, a hollow armature slidably mounted to operate over the tube and within the spool and a rod mounted within said guide tube and arranged to be engaged by said armature.

Signed at Bridgeport, in the county of Fairfield, and State of Connecticut, this 28th day of May, A. D., 1910.

GEORGE W. COLLIN.

Witnesses:
C. M. NEWMAN,
W. LE ROY KETCHUM.

Copies of this patent may be obtained for five cents each, by addressing the "Commissioner of Patents, Washington, D. C."